UNITED STATES PATENT OFFICE.

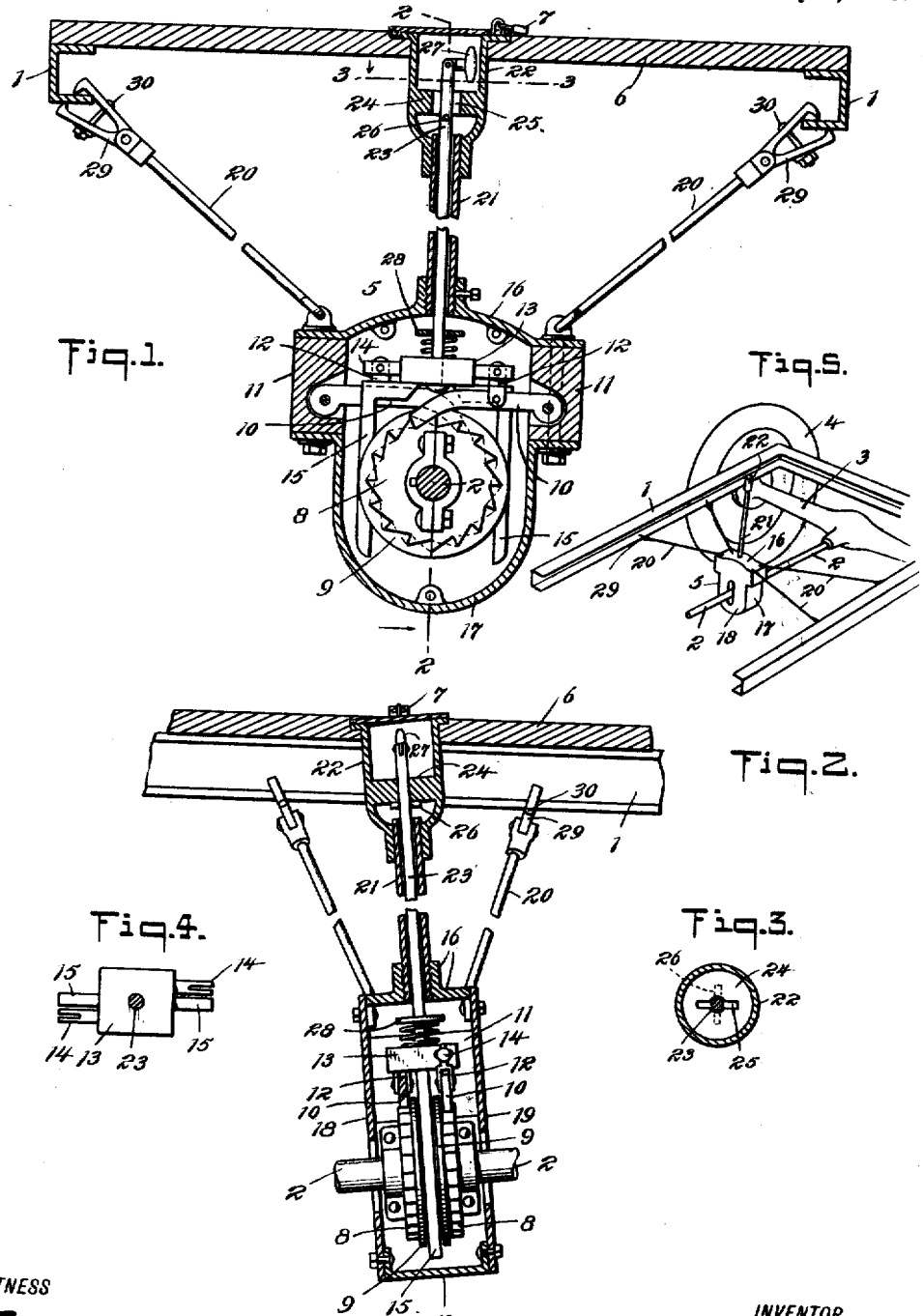

ERNEST F. HEINS, OF NEW YORK, N. Y.

MEANS FOR PREVENTING THE THEFT OF MOTOR-VEHICLES.

1,309,197. Specification of Letters Patent. Patented July 8, 1919.

Application filed June 26, 1918. Serial No. 242,114.

*To all whom it may concern:*

Be it known that I, ERNEST F. HEINS, a citizen of the United States, residing in New York, in the county of New York and State of New York, have invented certain new and useful Improvements in Means for Preventing the Theft of Motor-Vehicles, of which the following is a specification.

My invention relates to improvements in means for preventing the loss by theft of motor vehicles, especially motor vehicles employed for pleasure purposes.

The primary object of my invention is to provide an attachment for an automobile which will render the theft of the automobile practically impossible; and which is simple, inexpensive and easy to manufacture; and which, further, can be employed on any automobile now in use without in any way interfering with its operation or altering its outside appearance.

A further object of my invention is to provide a device which affords the desired result by holding part of the driving mechanism of the automobile stationary so that, when the device is properly applied, the automobile cannot be stolen by towing or hauling it away from the spot where the owner leaves it; the device in question being controlled by an operating element extending to the body of the car and being there inclosed in a suitable housing, to which access cannot be had, except by the person in charge of the automobile or some one authorized by him.

The following description, taken in connection with the accompanying drawings, sets forth a preferred form or embodiment of my invention; but I wish to be understood that I may change the details of what is actually shown herein, particularly as regards the shape, size and arrangement of the various parts; within the scope and spirit of my invention, as the same is expressed by the general meanings of the appended claims.

On the drawings:

Figure 1 represents a transverse vertical section taken through the flooring and chassis of an automobile bearing a construction embodying my invention, with the operative parts in elevation;

Fig. 2 is a section taken on the line 2—2 of Fig. 1;

Fig. 3 is a section taken on the line 3—3 of Fig. 1;

Fig. 4 is a top plan of a detail; and

Fig. 5 is a perspective view showing diagrammatically a portion of the chassis or frame of an automobile with an embodiment of my invention mounted in place thereon.

The same numerals identify the same parts throughout.

In the particular description of my invention as the drawings present same, I shall refer first to Fig. 5, whereon I show at 1 the side beams of the frame or chassis of an automobile having a shaft 2 which operates the shafts, not shown, in the casing 3, leading to the rear wheels 4. This shaft is generally termed the propeller shaft and is part of the driving mechanism of the vehicle.

My invention is applied to the shaft 2 forward of the rear wheels and preferably between the casing 3 and the usual change-speed gearing; and the embodiment illustrated herein is indicated as a whole by the numeral 5. It comprises means for holding the shaft 2 against movement of rotation in either direction; so that, when desired, the car can be prevented from being moved either forward or backward; and the parts which effect this result are controlled by a suitable operating element which can be actuated from above the floor 6 of the body of the car. See Figs. 1 and 2. For this purpose the upper portion of the operating element is inclosed in a suitable housing to be presently described, which is supported by the floor 6 and extends down through same; and access to this housing can be had only by way of a lid or closure, that can be fastened by any form of locking member, indicated at 7. Consequently when the owner desires to secure his car he raises the lid mentioned, manipulates the operating element inside the housing until the shaft 2 is engaged so as to be held against rotation and then shuts the lid and locks it. The car then cannot be moved on its wheels until the lid is lifted and the shaft 2 released.

The device 5 is illustrated in full on Figs. 1 and 2 and it comprises a pair of ratchets 8 mounted side by side on the shaft 2 and having oppositely arranged teeth. These ratchets are of course made rigid with the shaft 2 and between them is a disk 9 having a smooth circumferential rim or face, between flanges at each side, as best shown at Fig. 2. Each of the ratchets 8 is adapted to be engaged by locking dog or pawl 10, pivotally mounted in supporting members 11. When these dogs are lowered, as shown in Fig. 1, to engage the teeth of the ratchets 8, the shaft 2 is held against all rotational movement whatever.

Both dogs or members 10 can be lifted out of engagement with the ratchets 8 by means of links 12, carried by a head 13, which supports these links by having them pinned in the ends of slotted projections 14. To the head 13 is also fixed a yoke 15 which extends downward between the ratchets 8; the arms of this yoke passing between the flanges of the disk 9, these flanges forming, with the face of the disk between them, a groove which the arms of the yoke 15 may enter without in any way hindering the rotation of this disk with the shaft 2 when the automobile is in motion. Figs. 1 and 2 portray the relative arrangement of the pawls 10, the projections 14, and the yoke 15 in the direction of the axis of the shaft 2, and the disk 9 with its flanges merely serves as a guide for the yoke 15 when the head 13 is operated to raise or lower the dogs 10; and to keep the dogs always in the plane of the ratchets.

The members 11 may be in the shape of blocks or the like forming part of a casing for the ratchets, the dogs, etc. Above, these members 11 are bridged by a top 16, and are connected below by a curved plate forming a bottom 17; and suitable plates 18 and 19 may be secured to the ends of the members 11 and to the top and bottom to form the front and back of the casing. The front 18 and back 19 will have openings to enable the shaft 2 to pass through the same and these openings may be vertically elongated to allow for the up and down movement of the chassis permitted by the springs which suspend it above the axes of the wheels of the automobile.

I attach to the members 11 eyelet bolts to which are pivoted means for suspending the casing from the opposite side beams 1 of the car, such as hangers 20. These bolts may also serve to hold the top 16 and the bottom 17 to the members 11 by passing through flanges thereon; and a suitable number of these bolts, with an equal number of hangers will be thus utilized.

The top 16 may have a central boss which is bored through to receive a sleeve 21. This sleeve extends from the casing up to a housing 22. This housing is carried by the floor 6 of the body of the car; and, as shown in Figs. 1 and 2, it has a flange at its upper end which fits into a seat formed into the top surface of the floor 6; and this flange may have suitable holes for screws to enable the housing to be secured in place. From the seat in question the housing extends downward below the floor 6 and inside of this housing is the upper end of an operating rod or element 23. This rod or element runs from the housing through the sleeve 21 and has a head on its lower end which engages the bottom of the head 13. The head 13 is of course perforated to allow the rod 23 to pass through it. The rod can turn freely in the head 13, but when the rod is pulled upward it lifts the head 13 and raises the dog 10.

Inside the housing is a transverse web 24 which has an elongated slot 25; and the rod 23 is provided with a pin 26 which extends through it and is not quite as long as the slot 25. When the dogs 10 are down in operative position to engage the ratchets 8 this pin 26 will be below the slot 25 and extend across it; and when the dogs 10 are to be lifted the rod 23 must first be turned a quarter of a circle. When the rod is then pulled toward the floor 6 the pin 26 registers with the slot 25 and can pass through it. After the pin clears this web, the rod can be turned to make the pin be transversely of the slot 25, and the dogs 10 are thus kept out of engagement with the ratchets 8. The upper end of the rod 23 in the housing 22 will have a handle 27, and this handle may be pivoted to the upper end of the rod, if desired, so that it can be pushed downward to one side as indicated in Fig. 1.

The lower part of the rod 23 in the casing may be encircled by a loose washer 28 just above the head 13 and by putting a spiral spring on the rod between this washer and the head 13, the upward movement of the rod 23 and the head will be cushioned if the rod 23 is pulled too far. Hence the head 13 cannot be made to strike against the top 16.

On the upper ends of each of the hangers 20, which are pivotally connected to the eye bolts in the members 11, are a pair of pincer-like jaws 29, pivoted in place and provided with openings to receive headed bolts 30. These bolts 30 can be engaged by suitable nuts, and when these nuts are turned up the jaws 29 are of course drawn together. In this way the jaws 29 can be caused to grip the beams 1 as will be readily understood. The ends of these jaws may be either pointed or flat with transverse teeth or serrations, so that they can grip the beams 1 and securely hold to the same.

The utility and mode of my invention will now be apparent. As shown in the drawings the closure for the housing 22 is in the shape of a pivoted lid, and when it is shut a fixed staple passes through it, permitting it to be fastened by a locking member 7 engaging the staple. When the owner desires to lock his car he removes the member 7, raises the lid, and takes hold of the handle 27 of the rod 23, first lifting this handle if required; the rod extending up at least as far as the body of the car having the floor 6. He then rotates the rod, to move the pin 26 into registry with the slot 25, and then pushes the rod downward. By so doing he moves the dogs 10 into engagement with the ratchets 8 and thereafter the shaft 2 can not be turned. If he desires to leave his car he can push the handle 27 down out of the way, lower the lid of the housing 22, and apply the locking member. Hence no one can take the car away, either by starting the engine or by towing it with another car; because the wheels 4 are locked and theft of the car can not be effected by dragging it. The owner of course keeps the key himself after he leaves the car, and he can further insure his car against theft by having the housing 22 concealed under the floor covers, or by locating it under the seat, or in some other hidden or inconspicuous position.

The locking member 7 is indicated as having the shape of a pad lock, but I may of course employ locking members of other types to prevent the housing 22 from being opened by unauthorized persons.

When the owner wishes to run his car he undoes the locking member 7, lifts the lid of the housing 22, and pulls the rod 23, first turning it to enable the pin 26 to pass through the slot 25. Thus he lifts the dogs 10 out of engagement with the ratchet 8; and before the housing is closed, the rod must be turned to cause the pin 26 to lie across the slot 25 and thus prevent the dogs 10 from dropping when the rod is released. The engine can then be started, and the shaft 2 can turn freely, carrying the ratchets and the disk 9 with it. At this time the ratchets clear the dogs; and the disk 9 in turning will do no more than merely rub against the arms of the yoke 15.

The sleeve 21 can be secured to the housing 22 or the casing below it but not to both. In other words, it must have slidable engagement with respect to either the housing or the casing so that when the body of the car moves up or down on its springs the housing 22 and the casing below it can freely move to a certain extent toward and from each other. At the same time the casing can move to some extent with reference to the shaft 2 because of the vertical slots in the front and back of the same, and because of the manner in which it is suspended from the beams, by the hangers, with their pivoted gripping jaws 29. The purpose of the sleeve 21 is of course to prevent the rod 23 from being turned by a tool from a point below the floor 6 and above the top of the casing.

The hangers 20 may suspend the casing inclosing the ratchets, etc., so as to allow for the slant of the shaft 2 toward the axis of the wheels 4. See Fig. 2.

The means for holding the shaft 2 against movement and thus preventing movement of such other parts of the driving mechanism of the automobile as should not be permitted to move, consist primarily of the ratchets 8 and the dogs 12. The ratchets may be attached to the shaft 2 by making them in halves and bolting them together as shown in Fig. 1. They may be formed by casting in two pieces; each piece consisting of half of one ratchet, half of the disk 9 and half of the other ratchet, with projections to enable them to be assembled on the shaft and bolted after being fitted together. An ordinary key between the ratchets and the shaft may be utilized to spline the ratchets and prevent the shaft 2 from moving, except when the ratchets and disk are free to move or turn with it.

My invention can be easily applied, as one need only pierce the floor 6 to receive the housing 22, and cut a slot in the shaft 2 for the key of the ratchets 8. Hence the operation of the car is not interfered with or its appearance in any way affected.

It will be observed that one pawl and ratchet constitutes means for holding part of the driving mechanism against movement in one direction and the other pawl and ratchet constitutes means for holding part of the driving mechanism against movement in the opposite direction; and the operating means 23, when manipulated to drop the pawls, causes the two means to come simultaneously into effective relative positions. The housing 22 with the lid and locking member constitutes means for preventing access to the element 23 and operation by unauthorized persons of the entire means for holding the driving mechanism against movement through the element 23.

Of course when the owner wishes to lock his car as above set forth, he must take away the ignition controlling switch with him; so that the engine cannot be started, and neither can the car be made away with by towing it from the spot where he leaves it.

Having described my invention, what I believe to be new and desire to protect by Letters Patent of the United States is:

1. The combination of a motor vehicle, means for holding part of the driving mechanism thereof against movement, means for operating said holding means, and means for preventing access by unathorized persons to said operating means.

2. The combination of a motor vehicle and means for holding part of the driving mechanism thereof against movement, an operating element for controlling said means, a housing for said element and a locking member for said housing.

3. The combination of a pair of ratchets to be mounted on the propeller shaft of an automobile, said ratchets having oppositely disposed teeth, a dog for each ratchet, an operating rod for controlling the dogs, said rod extending to the body of the automobile, a housing carried by the body for the end of said rod, a closure for the housing and a locking member for said closure.

4. The combination of a pair of ratchets to be mounted on the propeller shaft of an automobile, said ratchets having oppositely disposed teeth, a flanged disk between said ratchets, a dog for each of said ratchets, a head attached to said dogs, a yoke carried by the head engaging said disk, and an operating rod secured to said head.

5. The combination of a pair of ratchets to be mounted on the propeller shaft of an automobile, said ratchets having oppositely disposed teeth, a flanged disk between said ratchets, a dog for each of said ratchets, a head attached to said dogs, a yoke carried by the head engaging said disk, an operating rod secured to said head, said rod extending to the body of the automobile, a housing for the end of said rod, a closure for the housing, and a locking member for the closure.

6. The combination of a casing, means in said casing for preventing movement of a part of the driving mechanism of the automobile, an operating rod extending out of said casing to the body of said automobile, means for suspending said casing from the framework of said automobile, a housing for said rod on the body of the automobile, and a sleeve for the rod between the casing and the housing.

In testimony whereof, I have signed my name to this specification this 28th day of May 1918.

ERNEST F. HEINS.